(12) United States Patent
Lippert et al.

(10) Patent No.: US 8,848,268 B2
(45) Date of Patent: Sep. 30, 2014

(54) MICROSCOPE WITH LIGHT SHEET ILLUMINATION

(75) Inventors: Helmut Lippert, Jena (DE); Matthias Wald, Jena (DE); Michael Goelles, Jena (DE); Robert Hauschild, Vienna (AT)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 13/498,095

(22) PCT Filed: Sep. 17, 2010

(86) PCT No.: PCT/EP2010/063666
§ 371 (c)(1),
(2), (4) Date: Mar. 23, 2012

(87) PCT Pub. No.: WO2011/036095
PCT Pub. Date: Mar. 31, 2011

(65) Prior Publication Data
US 2012/0281264 A1    Nov. 8, 2012

(30) Foreign Application Priority Data

Sep. 24, 2009 (DE) .......................... 10 2009 044 984

(51) Int. Cl.
*G02B 26/08* (2006.01)
*G02B 21/06* (2006.01)
*G02B 21/00* (2006.01)

(52) U.S. Cl.
CPC ............ *G02B 21/06* (2013.01); *G02B 21/0076* (2013.01); *G02B 21/0032* (2013.01)
USPC ....................... 359/199.3; 359/201.1; 359/388

(58) Field of Classification Search
None
See application file for complete search history.

(56) References Cited

U.S. PATENT DOCUMENTS

| | | |
|---|---|---|
| 2006/0033987 A1 | 2/2006 | Stelzer et al. |
| 2009/0237765 A1 | 9/2009 | Lippert et al. |
| 2011/0036996 A1 | 2/2011 | Wolleschensky et al. |

FOREIGN PATENT DOCUMENTS

| | | |
|---|---|---|
| DE | 102 57 423 A1 | 6/2004 |
| DE | 10 2007 015 063 A1 | 10/2008 |
| DE | 10 2008 009 216 A1 | 8/2009 |
| EP | 1 975 669 A2 | 10/2008 |
| WO | WO 2004/053558 A1 | 6/2004 |

OTHER PUBLICATIONS

Voie, A.H., et al., "Orthogonal-plane fluorescence optical sectioning: three-dimensional imaging of macroscopic biological specimens," *Journal of Microscopy*, vol. 170, Pt. 3, pp. 229-236 (Jun. 1993).

(Continued)

*Primary Examiner* — Jade R Chwasz
(74) *Attorney, Agent, or Firm* — Patterson Thuente Pedersen, P.A.

(57) ABSTRACT

A family of microscopes include an illumination device which produces a planar light sheet along an illumination axis of an illumination beam path and a transverse axis normal to the illumination axis. A detection device detects light emitted from the sample region along an axis of detection of a detection beam path. The illumination and detection axes as well as the transverse axis and the axis of detection being oriented relative each other at an angle unequal to zero. A light sheet generator also produces rotationally symmetrical light and includes structure and control for rapidly scanning the sample region along the transverse axis. The illumination device includes a second light sheet generator having a first astigmatically active optical element with at least one astigmatic lens for producing a static sheet of light. Selection elements used to select either the first or the second light sheet or both together to produce the sheet of light.

20 Claims, 8 Drawing Sheets

(56) References Cited

OTHER PUBLICATIONS

Huisken, Jan, et al., "Optical Sectioning Deep Inside Live Embryos by Selective Plane Illumination Microscopy," *Science*, vol. 305, pp. 1007-1009 (Aug. 13, 2004).

Reynaud, Emmanuel G., "Light sheet-based fluorescence microscopy: More dimensions, more photons, and less photodamage," *HFSP Journal*, pp. 266-275 (2008).

Keller, Philipp J., et al. "Reconstruction of Zebrafish Early Embryonic Development by Scanned Light Sheet Microscopy," *Sciencexpress*, 12 pgs. (Oct. 9, 2008).

Keller, Philipp, et al., "Quantitative in vivo imaging of entire embryos with Digital Scanned Laser Light Sheet Fluorescence Microscopy," *Current Opinion in Neurobiology*, vol. 18, pp. 1-9 (2009).

Becker, K., et al., "Ultramicroscopy: 3D reconstruction of large microscopical specimens," *J. Biophoton.*, vol. 1, No. 1, pp. 36-42 (2008).

Santi, Peter A., et al., "Thin-sheet laser imaging microscopy for optical Sectioning of thick tissues," *BioTechniques*, vol. 46, pp. 287-294 (Apr. 2009).

Huisken, Jan, et al., "Even fluorescence excitation by multidirectional Selective plane illumination microscopy," *Optics Letters*, vol. 32, No. 17, pp. 2608-2610 (Sep. 1, 2007).

MICROSCOPE WITH LIGHT SHEET ILLUMINATION

PRIORITY CLAIM

The present application is a National Phase entry of PCT Application No. PCT/EP2010/063666, filed Sep. 17, 2010, which claims priority from German Application Number 102009044984.1, filed Sep. 24, 2009, the disclosures of which are hereby incorporated by reference herein in their entirety.

FIELD OF THE INVENTION

The invention relates to a microscope comprising an illumination device which produces a light sheet to illuminate a sample region, the said sheet having an approximately planar extension in the direction of an illumination axis X of an illumination beam path and in the direction of a transverse axis Y lying across the illumination axis X. The microscope further comprises a detection device used to detect light that is radiated by the sample region along a detection axis Z of a detection beam path, the illumination axis X and the detection axis Z as well as the transverse axis Y and the detection axis Z being oriented relative to each other at an angle unequal to zero. Preferably, the respective axes are oriented approximately normal to each other. The illumination device further comprises first means for light sheet generation, which in turn comprise means for generating a rotationally symmetric light beam and scanning means for the light-sheet-like scanning of the sample region along the transverse axis in a specified time interval.

BACKGROUND OF THE INVENTION

Such a microscope design comes under the category known as SPIM microscopes (SPIM-Selective Plane Illumination Microscopy). In contrast to confocal laser scanning microscopy (LSM), in which a three-dimensional sample is scanned point by point in individual planes at different depths and the image information obtained thereby is subsequently assembled to form a three-dimensional image of the sample, the SPIM technology is based on wide-field microscopy and permits the imaging of the sample on the basis of optical sections through various planes of the sample.

The advantages of the SPIM technology consist, among others, in the greater speed at which the image information is detected, the reduced risk of bleaching of biological samples, and a greater penetration depth of the focus into the sample.

The principle of SPIM technology is that fluorophores contained in the sample originally or added to it for contrasting are excited with laser light, the laser radiation being shaped into a so-called light sheet. The light sheet is used to illuminate a selected plane in the depth of the sample in the sample region, and an imaging lens system is used to obtain an image of this sample plane in the form of an optical section.

First modern approaches to SPIM technology are described by A. H. Voie et al., Journal of Microscopy, Vol. 170 (3), pp. 229-236, 1993. Here, the fundamentals of modern SPIM technology are explained, in which a coherent light source is used to illuminate a sample, the light sheet being produced with the aid of a cylindrical lens. Arranged normal to the propagation direction of the light sheet, which has a finite thickness, though, are detection means comprising an imaging lens system and a camera.

In recent years, the technology was developed further, especially with regard to its application in fluorescence microscopy. For example, DE 102 57 423 A1 and, based on it, WO2004/053558A1 describe methods in which a light-sheet-like illumination is produced due to a relative movement between a line-shaped field of light and the sample to be examined. The light-sheet-like illumination is formed by the field of light being repeated in a temporal succession so as to be lined up side by side due to the relative movement. In this way, though, shadows are formed within the sample plane to be examined, on account of parts of the sample that lie in the direction of illumination and are not transparent to the illuminating light. Similar setups are also described by Stelzer et al., Science (305) pp. 1007-1009 (2004), and Reynaud et al., HFSP Journal 2, pp. 266 (2008).

Instead of a purely static light sheet, for the generation of which a cylindrical lens system is used, it is possible to produce a quasi-static light sheet by rapidly scanning the sample with a rotationally symmetric light beam. The integration time of the camera on which the sample is imaged is chosen so that the scan is completed within the integration time. Such setups are described, e.g., by Keller et al., Science (322), pp. 1765 (2008), and Keller et al., Current Opinion in Neurobiology 18, pp. 1-9 (2009).

All the setups and methods known in prior art, however, have more or less grave disadvantages, which restrict the use of the SPIM technology in the commercial sphere, where it is important, among other things, to achieve a high user friendliness of the microscopes and, as a rule, a high throughput, with a great number of samples having to be examined within a relatively short time. Essential disadvantages are described below.

In most of the setups using SPIM technology that have been implemented so far, e.g., those according to DE 102 57 423 A1 and WO2004/053558A1, the mere variation of the image field size for detection—e.g., switching from an image field size providing a good overview of the sample to a detail region—is rather a complex and time-consuming affair. It can only be implemented by a change of the detection objective. This affects the sample space unfavorably, which may have a particularly negative effect in case of a horizontal detection beam path. In the worst case, it also involves the removal and emptying of the sample chamber. After this, refocusing is necessary as a rule. Moreover, the sample is unnecessarily heated or cooled.

An improvement is described by Becker et al., Journal of Biophotonics 1 (1), pp. 36-42 (2008). Here, the detection beam path is arranged vertically, so that a change of the image field size can be carried out without any substantial interaction with the sample chamber volume. The detection objective can be put into the sample chamber and taken out from above in a simple manner. Nevertheless, slight interactions with the sample chamber and, thus, indirectly with the sample cannot be avoided.

Adaptation of the image field size is even simpler if zoom detection objectives are used. Such a setup is described, e.g., by Santi et al., Biotechnics 46, pp. 287-294 (2009). Here, a commercial microscope, the Olympus MVX10, which has a zoom objective, is used for detection. This, too, is inserted into the sample chamber from above, which is, as a rule, filled with an immersion liquid, so that, here again, there are slight interactions with the sample chamber when the zoom function of the objective is working or when the focus is adjusted, alone because of the motorized shifting of the lenses, which may cause vibrations that may transmit to the liquid in the sample chamber.

If the image field size for detection is changed, it is also desirable to adapt the illumination-side image field, i.e. to adapt the extension of the light sheet along the transverse axis Y and the detection axis Z. In prior art, this adaptation has so far been implemented by the use of interchangeable diaphragms and/or beam expanders, as described, e.g., by Keller et al., Science 322, pp. 176 ff. (2008), and by Huisken et al., Optics Letters 32 (17), pp. 2608-2610 (2007). The flare occurring in case of diaphragms causes light losses, whereas the use of beam expanders reduces flexibility, since exchanging them is rather laborious.

While in the classical way, as described, e.g., in WO2004/053558A1, the light sheet is produced via cylindrical lenses arranged in the beam path, the recent state of prior art, as described, e.g., in the above-mentioned article by Keller et al., Science 322, pp. 176 ff. (2008), uses setups in which no static light sheet is produced but merely a quasi-static light sheet, where the sample is rapidly scanned by a rotationally symmetric light beam. 'Rapidly' means that the integration time of the spatially resolving array detector used as a rule, e.g., a camera with CCD chip or CMOS chip, is chosen so that the light beam scans the sample region corresponding to the quasi-static light sheet within this integration time. The integration time—which, in the camera, e.g., corresponds to the shutter opening time—and the scanning frequency or scanning time of the light beam may, as a rule, be set independently of each other, so that the scanning time can be adapted to a fixed integration time. As scanning with a rotationally symmetric light beam also produces a light sheet, at least in effect, this approach is also subsumed under the generation of a light sheet.

Both kinds of light sheet generation have advantages and disadvantages. With the use of cylindrical lenses, e.g., there is less of a load on the sample, because the intensity with which the sample is irradiated can be selected at a lower level while nevertheless the same dose is achieved as in case of scanning. Also, the use of cylindrical lenses is well suitable for recording image sequences in fast succession within very short times, since the speed is not limited by movable elements in the illumination beam path. In particular, a stroboscope-like illumination can be implemented very well with the use of cylindrical lenses. In scanning, the swiveling scanning mirror used, as a rule, is apt to be the speed-limiting element. If plain scanning is combined with angular scanning, i.e. illumination from different angles, in order to reduce banding as described, e.g., in DE 10 2007 015 063 A1, there is a risk that beat artefacts will be produced if the scanners for light sheet angle scanning and position scanning are not matched, i.e. not synchronized.

Advantages of light sheet generation by scanning are given by, among other things, the fact that it permits a more homogeneous illumination of the sample, so that quantitative image evaluations are possible as well, which by the use of a cylindrical lens system can be achieved only approximately by flaring through a diaphragm, which entails light losses. Moreover, a flexible choice of the maximum deflection of the scanner will permit the size of the image to be adapted with high flexibility. Scanning reduces the spatial coherence of the excitation light, which also leads to a reduction of banding. Finally it is possible, by special modulations of the light source, e.g. with an AOTF, to project grid patterns into the sample.

In other setups described in prior art, the sample is illuminated from both sides, from opposite directions along the illumination axis X. In the setup described by Santi et al., Biotechnics 46, pp. 287-294 (2009), the sample is illuminated simultaneously from both sides. For many kinds of samples, such as embryos of the fruit fly (Drosophila), such a setup is not of advantage, because in this way scattering and non-scattering image portions are combined in an unfavorable way. Huisken et al., Optics Letters 32(17), pp. 2608-2610 (2007), and Becker et al., Journal of Biophotonics 1 (1), pp. 36-42 (2008), describe setups that illuminate the sample sequentially, i.e. alternately from the two directions along the illumination axis X, which is more favorable for the sample mentioned above. For switching back and forth between the two illumination directions, a vibration-producing shutter or a rotating mirror is used, so that the times required for switching are relatively long.

Keller et al., in Science 322, pp. 1765 ff. (2008) and in Current Opinion in Neurobiology, 18, pp. 1-9 (2009), describe an SPIM setup in which the illumination and/or detection objective is mounted on a piezo motor, which permits focusing. Here, then, setting the focusing distance is accomplished via a displacement of the entire objective. In particular, the distance of the front lens from the image plane is not maintained, so that an interaction with the sample chamber is possible. This applies especially to horizontal detection beam paths with immersed detection objectives: Here, the necessary movement of the objective entails tightness problems. On the other hand, a movable element in the sample space is disturbing in general, as the user may need space there for diverse means for feeding to the sample chamber. The vibrations occurring during the movement of the objective may be unfavorably transmitted to the sample, since the space between the objective and the sample is occupied by a liquid rather than by air.

If scanners are used for producing the light sheet, the imaging of the scanner into the pupil of the illumination objective is not optimal, as a rule, so that the plain position scanning is superposed by portions of angular scanning.

Also known in prior art are setups in which the detection beam path is split up into two branch beam paths; this is described, e.g., in the two publications by Keller et al. mentioned above. For the beam splitting one uses beam splitters which transmit part of the light into one branch beam path and reflect the other part of the light into the other branch beam path. For this purpose one uses common dichroic filters having a relatively small thickness of less than 2 mm, which are arranged in a divergent part of the detection beam path. The advantage of such an arrangement is that in the direction of transmission there occur hardly any artefacts caused by astigmatism. In the direction of the reflected light, however, image artefacts such as astigmatism or also defocusing do occur, due to surface tensions at the dichroic filter, which can be caused, e.g., by the coating, or by improper installation. Another way of splitting into two branch detection beam paths is described by Huisken et al. in Optics Letters 32, pp. 2608-2610 (2007). Here, the dichroic filter is located at infinity (related to the beam path), so that, here again, the problems occurring in transmission are minimized. As far as the reflected branch beam path is concerned, though, the problem of surface tensions may occur here, too, if conventional dichroic filters are used.

SUMMARY OF THE INVENTION

A microscope comprising an illumination device which produces a light sheet to illuminate a sample region, the said sheet having an approximately planar extension in the direction of an illumination axis X of an illumination beam path and in the direction of a transverse axis Y lying across the illumination axis X. The microscope further comprises a detection device used to detect light that is radiated by the sample region along a detection axis Z of a detection beam path, the illumination axis X and the detection axis Z as well as the transverse axis Y and the detection axis Z being oriented relative to each other at an angle unequal to zero. Preferably, the respective axes are oriented approximately normal to each other. The illumination device further comprises first means for light sheet generation, which in turn comprise means for generating a rotationally symmetric light beam and scanning means for the light-sheet-like scanning of the sample region along the transverse axis in a specified time interval.

The illumination device comprises second means for light sheet generation, these comprising a first astigmatically acting optical element with at least one astigmatic lens for generating a static light sheet, and that, moreover, selecting means are provided with which, for generating the light sheet, one can select either the first or the second means for light sheet generation, or both together. As astigmatically acting lens one can use, e.g., a cylindrical lens; but some other astigmatically acting lens such as a Powell lens may be used as an equivalent thereof.

Whereas the first means for light sheet generation may generate a quasi-static light sheet by means of a fast scanning mirror, the second means for light sheet generation may generate a static light sheet. In this way, the advantages of scanning light sheet generation can be combined with those of light sheet generation by means of a cylindrical lens system. For expediency, the scanning means comprise a rapidly switchable scanning mirror and a scanning objective. One can, selectively, use one or the other method of light sheet generation; thus it is possible, e.g., to leave the scanning mirror in its zero position and, by means of the cylindrical optical element, to generate a static light sheet, which illuminates the sample in the manner of a stroboscope, for which the scanning mirror is too slow. In addition, angle scanning means may be provided, by means of which the angle between the light sheet and the illumination axis can be varied. The angle scanning means, too, may comprise a rapidly switchable angle scanning mirror. This may be, for example, a resonance scanner of the microelectromechanical type. As a rule, the angle scanning mirror operates at a frequency of 10 kHz, whereas the scanning mirror for generating the light sheet operates at a frequency approximately between 1 kHz and 2 kHz.

The angle scanning mirror may be arranged conjugated to the illumination focal plane if the second means for light sheet generation have been selected, i.e., if, for example, the cylindrical optical element is in the beam path. By means of the angle scanning mirror, the sample can be illuminated from different angles, which can be used to reduce banding.

In addition to the fast scanning mirror for light sheet generation, and in its immediate vicinity, another fast scanning mirror may be placed in the beam path, with which, e.g., the light sheet can be shifted in the direction of the detection axis for adjusting purposes, or the light can be deflected into another illumination beam path; the latter action, however, can also be performed by means of a separate switching mirror.

In addition, then, a second astigmatically acting optical element, which also may be configured as a cylindrical optical element, may be arranged in the illumination beam path. This serves to correctly image one of the two scanning mirrors onto a pupil plane, while the other scanning mirror is correctly imaged without the action of the cylindrical optical element. Essentially, this second element is a corrective optical system for the correct imaging of the two scanning mirrors mentioned.

It is understood that the features mentioned before and those to be explained below are applicable not only in the combinations stated but also in other combinations or as stand-alone features without leaving the scope of the present invention.

BRIEF DESCRIPTION OF THE DRAWINGS

Below, the invention will be explained exemplarily in more detail with reference to the accompanying drawings, which show features essential to the invention, among others, and in which.

DETAILED DESCRIPTION

Figure 1:
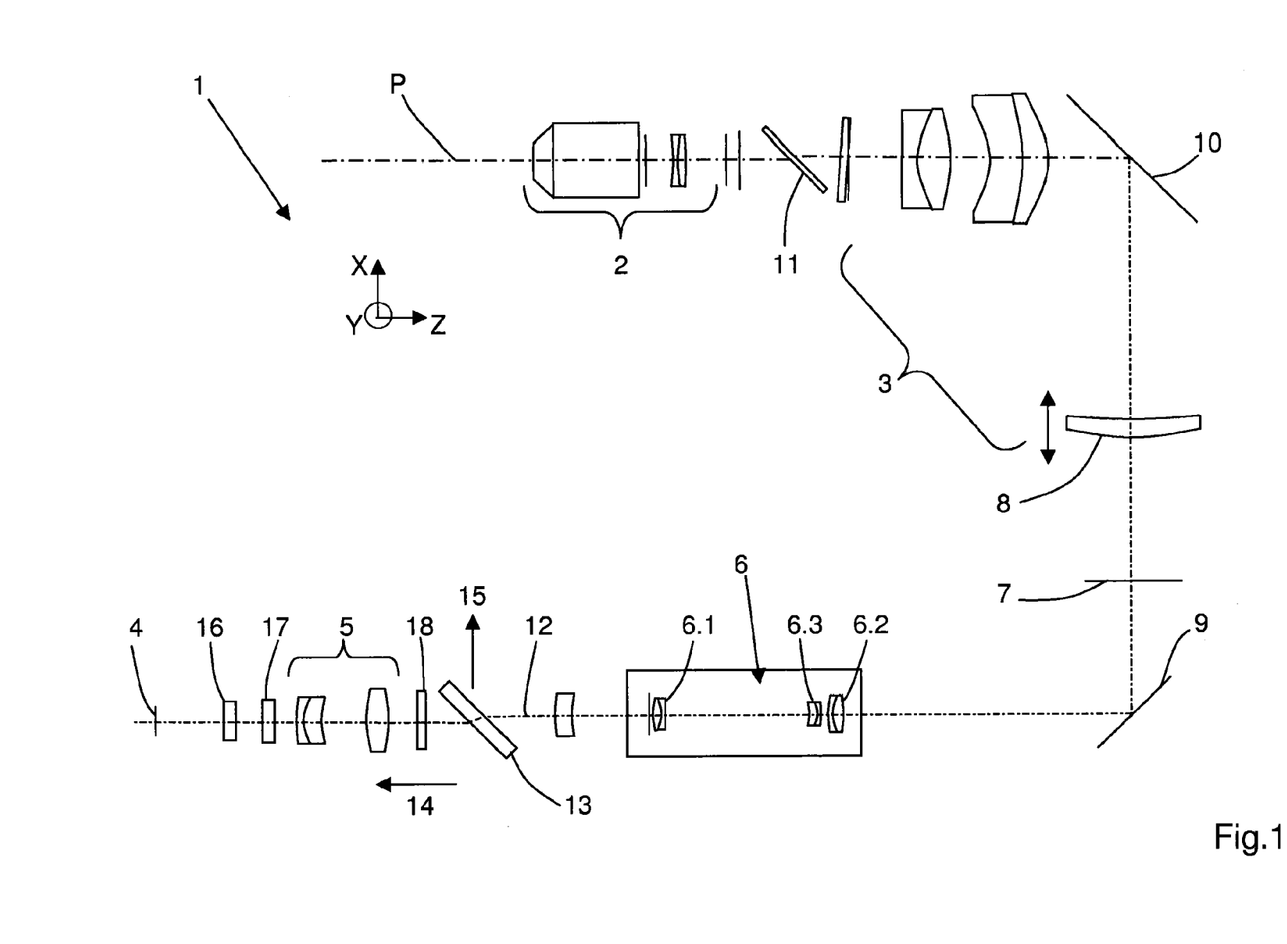
FIG. 1 shows a detection beam path for an SPIM microscope.

FIG. 1 shows a detection beam path of a microscope operating by the principle of SPIM technology. Pertaining to it, though not shown in FIG. 1, is an illumination device of the microscope, with which a light sheet for illuminating a sample region P is generated. In the direction of an illumination axis X of an illumination beam path and in the direction of a transverse axis Y lying at a right angle to the illumination axis X, the light sheet has an approximately planar form. Shown along the detection beam path are elements of a detection device 1 used to detect light that is radiated by the sample region P along a detection axis Z. The illumination axis X and the detection axis Z are approximately perpendicular to each other, as are the transverse axis Y and the detection axis Z.

The detection device 1 comprises a detection objective 2 arranged in the detection beam path. Other essential elements in the detection beam path 1 are a tube lens unit 3 and a spatially resolving array detector 4, which may be designed, e.g., as a CCD chip or as a CMOS chip of a suitable camera. The light is imaged onto this array detector 4 by means of an optical imaging element 5.

An essential element of the detection device 1 is an optical detection element, which is arranged so as to be separated from the front lens of the detection objective 2 and can be adjusted independently of this front lens. By means of the optical detection element, on the one hand, the size of a detection image field is continuously variable, and on the other hand, the detection element can be used to continuously shift a detection focal plane in the sample region P. The detection element can be designed so as either to serve only one of the two tasks or both tasks alternatively, or so that both settings can be carried out simultaneously. The detection element may be an integral part of the detection objective 2, e.g., in the form of two or more lens components that are movable relative to each other, whereas the front lens remains stationary during the movement of these lens components. Alternatively, the detection element may be arranged as a separate component in the beam path at a distance from the detection objective 2. During an adjustment of the detection element, i.e., a shifting of one or several of its lens components along the beam path, the front lens remains stationary.

The optical detection element as a separate component may be designed, e.g., as shown in FIG. 1, as a detection zoom element 6 with two movable lens components 6.1 and 6.2 and a fixed lens component 6.3 between them. The use of a detection zoom element 6 enables easy switching between an overview image and a detail image, or efficient locating of the sample details of interest. Furthermore, by means of the detection zoom element 6, the recording of image stacks along the detection direction Z at different sample angles—so-called multiview image stacks—is possible in an easy way. The detection zoom element 6 can be adjusted completely by motor drive. For the automatic compilation of tables of control element positions, one can use an intermediate image sample such as a transmission pattern, e.g., a transmission grid pattern 7, which is moved into an intermediate image plane of the detection beam path. In FIG. 1, this transmission grid pattern 7 is shown in the moved-in state; however, it can also be moved out and is not needed for detection once all parameters have been ascertained. Alternatively, a calibration objective (not shown) can be used in the beam path instead of the detection objective 2.

The setup shown can also facilitate the recording of so-called multitrack micrographs at different wavelengths of light, as one can make use of the fact that different tables for position settings can be compiled for different emission wavelengths. By adjusting the detection zoom element 6 accordingly, one can thus compensate longitudinal chromatic aberrations of the detection device 1.

It is advantageous for this purpose to continuously shift the focal plane in the sample region P by means of the detection zoom element 6. Since the detection zoom element 6 is arranged separately from the detection objective 2, the masses to be moved are very small, as the detection objective 2 itself need not be moved. By means of the detection zoom element 6, which is arranged in a stationary position in the detection beam path, one can effect what is known as internal focusing of the detection beam path. Because of the smaller masses to be moved, image stacks along the detection direction Z, which require repeated focus adjustment, can be recorded at higher accuracies and speeds.

Moreover, water sealing of the sample chamber is facilitated, since the detection objective 2, or its front lens, does not move relative to the sample chamber, in which the sample is placed and whose sample region P is illuminated. Interactions with the sample by vibrations are thus avoided, and no additional forces act on the sample. Moreover, it is possible to specify the detection focal plane as a function of the temperature of the liquid with which the sample chamber is filled, for which purpose the temperature of this liquid is measured and a focus position is adjusted accordingly. If the temperature changes, this change is signaled to the detection element via an evaluation unit and a control unit, and the detection focal plane is adjusted accordingly. In this way, a variation of the refractive index of the liquid with which the sample chamber is filled can be compensated. Frequently, water is used as a liquid or immersion medium. Refractive index data may be stored for different liquids; if the user specifies which immersion medium is used, correct adjustment can then be carried out automatically. This kind of temperature-dependent variation of the detection focal plane can be used, for example, in so-called heat shock experiments, in which the sample or the immersion liquid is subjected to great temperature changes within a very short time.

In the example shown, the detection zoom element 6 is designed to have two movable lens components 6.1, 6.2, between which there is a fixed lens component 6.3; however, other designs with more movable lens components or with only one movable lens component are possible. For example, it may quite well be provided not to use the detection zoom element 6 for internal focusing, i.e. the continuous shifting of the detection focal plane. In this case, one can use, e.g., a tube lens 8 of the tube lens unit 3 for shifting the detection focal plane in the sample region, i.e. for internal focusing. This tube lens 8, then, is arranged so as to be movable along the beam path, as shown symbolically by the double-headed arrow. The tube lens unit 3 is also arranged separately from the detection objective 2, and likewise so from the detection element or detection zoom element 6.

The detection device 1 features several further optical elements, of which some that are more essential are described below. To achieve a compact design, the beam path is directed from the sample region P to the spatially resolving array detector 4 via deflecting mirrors 9 and 10. By means of the beam coupler 11, an additional beam path can optionally be coupled in, which can be used for reflected-light illumination. Moreover, a dichroic beam splitter 13 may be arranged in the beam path between the zoom element 6 and the imaging element 5 in the near-infinity space 12 of the beam path, i.e., in a range in which the beam is collimated as much as possible but not necessarily completely, the said dichroic beam splitter 13 serving as a splitting means for splitting the detection beam path into two branch beam paths 14 and 15, with a spatially resolving array detector on which the light to be detected can be imaged being arranged in each of the branch beam paths 14 and 15. FIG. 1 shows only the optical elements for the branch beam path 14; the branch beam path 15 may be of identical design.

The dichroic beam splitter has a thickness of more than 3 mm, so that problems such as imaging aberrations due to the occurrence of surface tensions as known in prior art can be avoided. In each of the two branch beam paths 14 and 15, optical imaging elements for the imaging of the light to be detected onto the respective array detector are arranged. In at least one of the two branch beam paths 14 or 15, wobble plates 16 and 17 may optionally be arranged, with which an offset can be adjusted in the two orthogonal directions transversely to the detection axis Z. In this way, an automatic superposition of the measurement data read out from the two array detectors can be accomplished. This is meaningful, e.g., if images for two different emission wavelengths are to be recorded separately and then superposed. For this purpose, FIG. 1 also shows an optional emission filter 18 in the branch beam path 14, with which a wavelength selection can be carried out. A corresponding emission filter 18, which selects another wavelength, may be arranged in the other branch beam path 15. In addition, for the correct adjustment of image superposition, an intermediate image sample may be used for calibration, in such a way that the above-mentioned transmission grid pattern 7 is used in an intermediate image plane of the detection beam path, or that a calibration objective (not shown) is used instead of the detection objective 2.

Furthermore, the optical imaging elements in the respective branch beam paths may also be arranged so as to be shiftable, so that it is possible to focus on either respective array detector.

Figure 2:
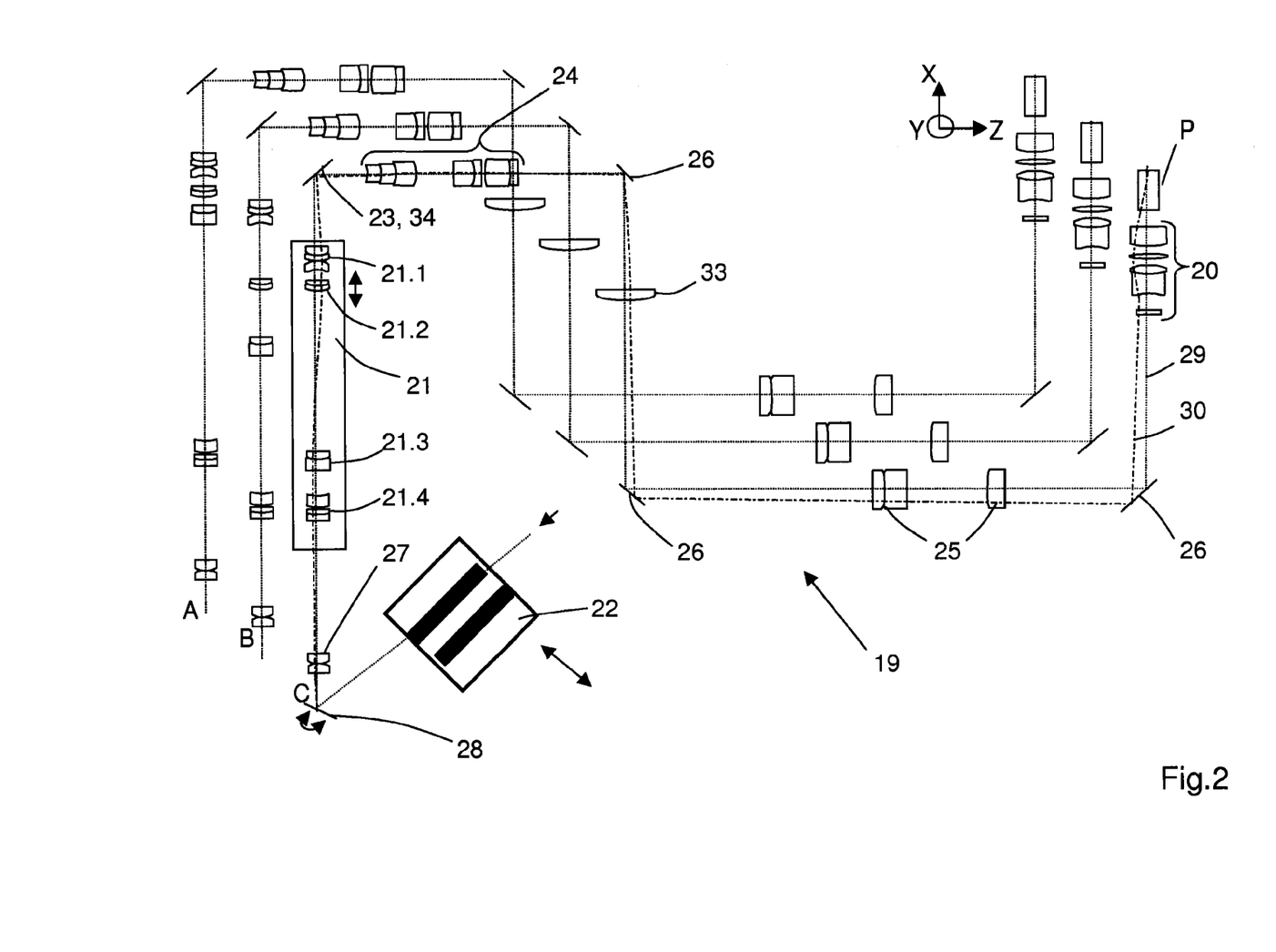
FIG. 2 shows three different settings of the illumination beam path for an SPIM microscope.

FIG. 2 shows an illumination device 19, with which a light sheet to illuminate a sample region P is generated, which light sheet is of approximately planar form in the direction of an illumination axis X of an illumination beam path and in the direction of a transverse axis Y transversely to the illumination axis X. For the sake of clarity, a detection device 1 as shown as an example in FIG. 1 has been left out here, but both can readily be combined with each other, with mutual alignment being accomplished in accordance with the coordinate systems shown in FIGS. 1 and 2.

The illumination device 19 illustrated in FIG. 2 is shown in three different configurations A, B and C. The illumination device 19 comprises, in the illumination beam path, at least one illumination objective 20 and an illumination element that is arranged at a distance from a front lens of the illumination objective 20 and can be adjusted independently of this front lens, by means of which illumination element the extension of the light sheet in the direction of the detection axis Z is continuously variable and/or by means of which an illumination focal plane in the sample region P can be shifted continuously. The illumination element may be an integral part of the illumination objective 20, e.g., in the form of two or more lens components that are movable relative to each other, whereas the front lens remains stationary during the movement of these lens components. Alternatively, the illumination element may be arranged as a separate component in the beam path at a distance from the illumination objective 20. During an adjustment of the illumination element, i.e., a shifting of one or several of its lens components along the beam path, the front lens remains stationary.

The illumination element can thus be used to continuously adapt the light sheet to the image field size and to set the focus. This is possible in a simple way if, e.g., the illumination element is designed as an illumination zoom element 21. This can then be used, particularly if the detection device 1 is also provided with a detection zoom element 6, to optimally and continuously match the numerical aperture of the illumination with the size of the detection image field. Compared to other solutions such as interchangeable telescopes, adaptation of the numerical aperture by means of the illumination zoom element 21 can be done continuously. Compared to other solutions such as diaphragms, no excitation light will be lost, so that, in the end, the illumination source required—as a rule a laser—may have a lower output. In this way, the load on the sample is reduced, higher power densities can be achieved, and the illumination objectives 20 need to be changed less frequently. The ratio between the size of the detection image field and that of the illumination image field can be adjusted in such a way that a ratio of the light sheet thicknesses of 1 in the center to 2 on the margin of the field of view can be set and kept constant when the image field size is varied.

If it is possible in addition, by means of the illumination element, to continuously shift the illumination focal plane in the sample region P—an adjustment that is also accomplished by internal focusing similar as in case of the detection zoom element 6, with one or several lens elements of the illumination zoom element 21 being shifted relative to each other—, the waist of the sheet of light can also be shifted continuously across the field of view in the direction of the illumination axis X, a process called waist scanning. In this process, maximum resolution in the detection direction Z can be achieved all over the field of view.

In combination with illumination from two sides along the illumination axis X, internal focusing permits the waists to be positioned to approx. ¼ and approx. ¾ of the field of view. In this way, variations of the thickness of the light sheet can be kept distinctly smaller than in case of illumination from one side only. Finally, in analogy to temperature-dependent focusing as described in connection with the detection zoom element 6, compensation of the position of the light sheet waist as a function of the temperature of the immersion medium or of differing optical thicknesses of the medium used for mounting the sample is possible.

For adapting the illumination-side image field size or the extension of the light sheet to the size of the detection image field, it is of advantage to couple the illumination zoom element 21 and the detection zoom element 6 via a control circuitry for setting the illumination zoom element 21 as a function of the size of the detection image field given by the detection zoom element 6. In this case, if the size of the detection image field is changed, e.g., manually by an observer, the illumination-side image field size is automatically adapted to this change. The observer is thus spared illumination-side adaptation of the illumination zoom element 21, as this is accomplished by the control circuitry, so that the numerical aperture for illumination is always set at an optimum.

The illumination zoom element 21 shown in FIG. 2 is provided with at least three independently shiftable lens components 21.1, 21.2 and 21.3 and a fixed lens component 21.4. The beam paths A, B and C show three different positions of the illumination zoom element 21. The use of three shiftable elements is necessary in this case in order to ensure not only the correct magnification but also the correct imaging of pupil and intermediate image; altogether, then, three degrees of freedom can be set. Where fewer degrees of freedom are relevant, fewer shiftable elements will suffice.

Figure 3:
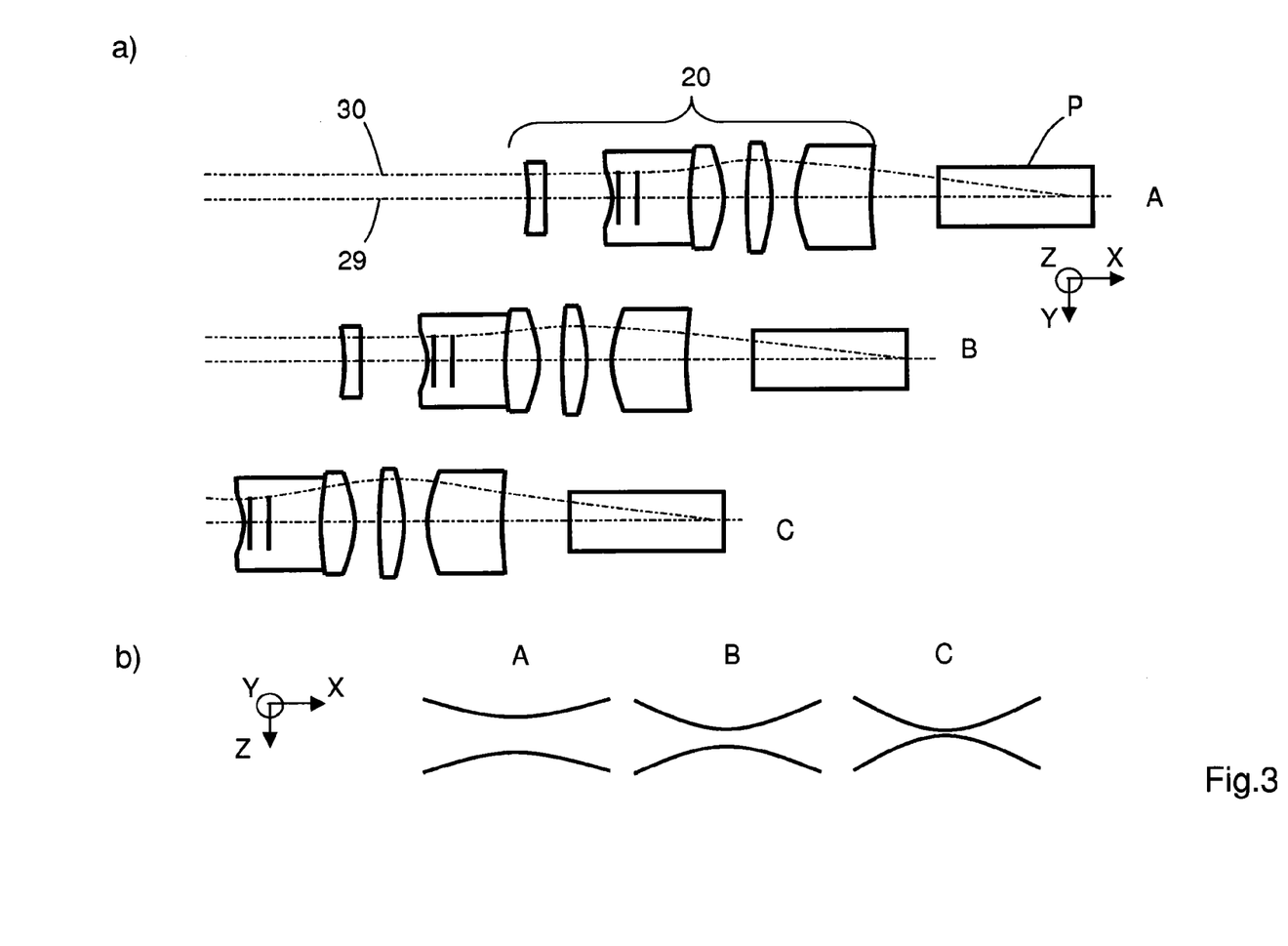
FIG. 3 shows details for the settings shown in FIG. 2.

The effect of the illumination zoom element 21 is shown in some more detail in FIG. 3 for the three different configurations A, B and C. The illumination zoom element 21 reveals its effect both in the plane spanned by the illumination axis X and the transverse axis Y, as shown in FIG. 3*a*, and in the plane spanned by the illumination axis X and the detection axis Z, as shown in FIG. 3*b*. In FIG. 3*b* one can see how, by adaptation of the illumination aperture, the light sheet thickness from position A to position B to position C of the illumination zoom element 21 is rendered increasingly thinner. In FIG. 3*a*, the adaptation resulting from the setting of the illumination zoom element 21 is shown in the X-Y plane.

To further increase the flexibility regarding the selection of the illumination aperture, the illumination device 19 may also comprise a telescope changer 22, which accordingly broadens the range of apertures achievable. As an alternative or an addition, the illumination objective 20 can be changed to generate a similar effect.

The illumination device 19 shown in FIG. 2 furthermore comprises first means for light sheet generation, which in turn comprise means for generating a rotationally symmetric light beam and scanning means for light-sheet-like scanning of the sample region along the transverse axis Y in a specified time interval. Whereas the means for generating the rotationally symmetric light beam are not shown, the scanning means of the setup shown in FIG. 2 comprise a scanning mirror 23, with which the rotationally symmetric light beam is guided across the sample, at such a speed that the scanner sweeps the sample at least once, but preferably several times, and in any case completely, during the integration time, i.e. the time that passes before the measurement data are read out from the detector; in other words, the integration time must not end as long as the light beam still sweeps the sample. Integration time, scanning time and scanning runs are tuned to each other, so that the specified time interval essentially equals the integration time. The effect of the scanning mirror 23 is not shown in FIG. 2 and FIG. 3, though.

The illumination light leaving the scanning mirror 23 is imaged into the sample region P via a scanning objective 24, a tube lens element 25 and the illumination objective 20. To make the setup as compact as possible, various mirrors 26 are used for beam deflection.

In addition to the scanning mirror 23, the illumination device 19 is optionally provided with second means for light sheet generation, which comprise a first astigmatically acting optical element—in the example shown this is a first cylindrical optical element 27 with at least one astigmatic lens, here a cylindrical lens—for generating a static light sheet. Also provided (not shown) are selecting means, with which, for generating the light sheet, either the first or the second means for light sheet generation or both together can be selected. This means that either the scanning mirror 23 or the cylindrical optical element 27 or both together are used. The cylindrical optical element 27 may be designed, e.g., in such a way that it can be moved into or out of the beam path laterally. In this way, the advantages of both methods for light sheet generation, each described above, can be combined. Instead of a cylindrical lens, the first astigmatically acting optical element may also comprise a Powell lens or other astigmatically acting lenses.

In particular, the general coverage of the image field in the sample region P is linked to the cylindrical optical element 27, which, in the setup shown here, is used simultaneously with the scanning mirror 23. The cylindrical optical element 27, though, cannot cover the full image field in every position of the illumination zoom element 21.

In FIG. 2, the illumination device 19 further comprises optional angle scanning means. In the embodiment shown in FIG. 2, the angle scanning means comprise a rapidly switchable angle scanning mirror 28. By means of the angle scanning mirror 28, the angle between the light sheet and the illumination axis X is variable. As an angle scanning mirror 28, one can use, e.g., a resonance or polygon scanner, including such of a microelectromechanical type. In the case of the first cylindrical optical element 27 being used, the angle scanning mirror 28 is arranged so as to be conjugate with the illumination focal plane. By means of the angle scanning mirror 28, the sample can be illuminated from different angles, which can be used to reduce banding. In FIG. 2, the action of the angle scanning mirror 28 is illustrated for configuration C by the two beam paths 29 and 30. Whereas in beam path 29 the angle scanning mirror is in zero position, i.e., not deflected, beam path 30 applies in case of a deflection of the angle scanning mirror 28 different from zero. This is shown again for all configurations A, B, C in FIG. 3a. The angle scanning mirror 28 operates, as a rule, at a frequency of 10 kHz, whereas the scanning mirror 23 for generating the light sheet operates at a frequency approximately between 1 kHz and 2 kHz.

The use of the cylindrical optical element 27 is of advantage also because, in case of simultaneous use of the angle scanning mirror 28, any beat artefacts that may occur due to asynchronous triggering of the angle scanning mirror 28 and the rapidly switchable scanning mirror 23 are, in part, blurred by the cylindrical optical element 27 placed in the beam path. As the use of the cylindrical optical element 27 parallels the light beam, the intensity of illumination is reduced compared to the sole use of the rapidly switchable scanning mirror 23, which is less harmful for the sample.

Figure 4:
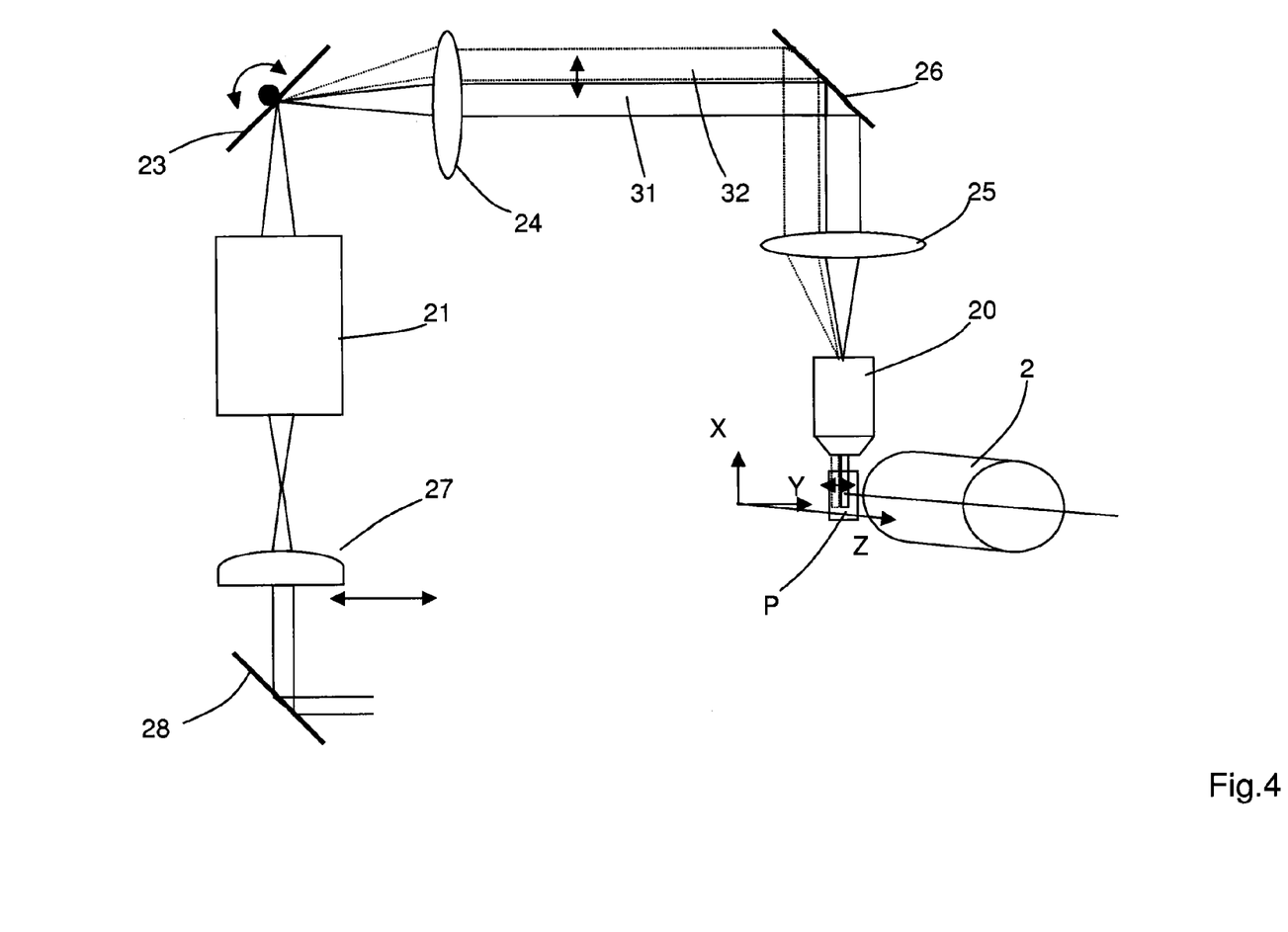
FIG. 4 shows another illumination beam path.

The action of the cylindrical optical element 27 in combination with the rapidly switchable scanning mirror 23 is shown again and in detail in FIG. 4, although here, the various elements of the illumination device are illustrated only roughly by a few representatives. It is obvious here that, if a cylindrical optical element 27 is used alone, given the position of the illumination zoom element 21 sketched here, only part of the image field can be covered, so that the fast scanning mirror 23 has to be used to achieve complete coverage. Without a deflection of the fast scanning mirror 23, the light is imaged into the sample region P along the beam segment 31, whose outlines are shown here. With a deflection different from zero, the light can be directed into the sample region P along the beam section 32. By means of the additional scanning movement of the scanning mirror 23, then, a homogeneous illumination of the sample region P can be achieved. If one refrains from using the scanning mirror 23, though, a very fast, stroboscope-like illumination of the selected sample region becomes possible, which otherwise would be prevented by the slower movement of the scanning mirror 23.

Arranged additionally in the illumination beam path of the illumination device 19 in FIG. 2 is a second astigmatically acting optical element, which is here, for example, a second cylindrical optical element 33. Instead of a cylindrical optical element 33 with at least one cylindrical lens, astigmatically acting elements with Powell lenses can be used as well. This second cylindrical optical element is an optional one, too. It is intended for imaging the fast scanning mirror 23 onto a pupil plane and for imaging the angle scanning mirror 28 onto an illumination focal plane. Without this additional second cylindrical optical element 33 (a correction element), the fast scanning mirror 23 and a switching mirror 34 possibly arranged in the same or an equivalent place in the illumination beam path, intended for light sheet adjustment and/or deflection of the illumination light into a second illumination beam path for illumination from two sides, will only approximately be positioned in the pupil plane of the illumination optical system. The consequence of this is that a position movement in the sample region P, produced by one of the two mirrors 23 or 34, is superposed by a certain share of an angular movement. This can have an unfavorable effect especially for the deflecting mirror 34 (which may perhaps also be used for adjusting the light sheet in the detection direction), because depending on the position of the mirror, an oblique position of the light sheet relative to the detection plane may result.

However, since the illumination in light sheet microscopy features inherent astigmatic properties, these properties can be utilized to achieve exact pupil imaging of both mirrors 23 and 34. The cylindrical optical element 33 acts on one axis only; it is designed and positioned in such a way that the scanning or deflecting mirror that also acts in this axis is imaged onto the pupil. Furthermore, the beam path is designed so that the mirror which acts in the other axis and on which the action of the cylindrical optical element 33 has no influence is also imaged exactly. A superposition of angular shares on a position movement in the sample region P can thus be avoided. Furthermore, the cylindrical optical element 33 can be so designed that the angle scanning mirror 28 is imaged exactly onto the sample plane. Thus, a superposition of the angular movement with a position movement in the sample region P is avoided. As the two mirrors 23 and 34 are arranged very close to each other, the cylindrical optical element 33 is configured to have a very long focal length.

Figure 5:
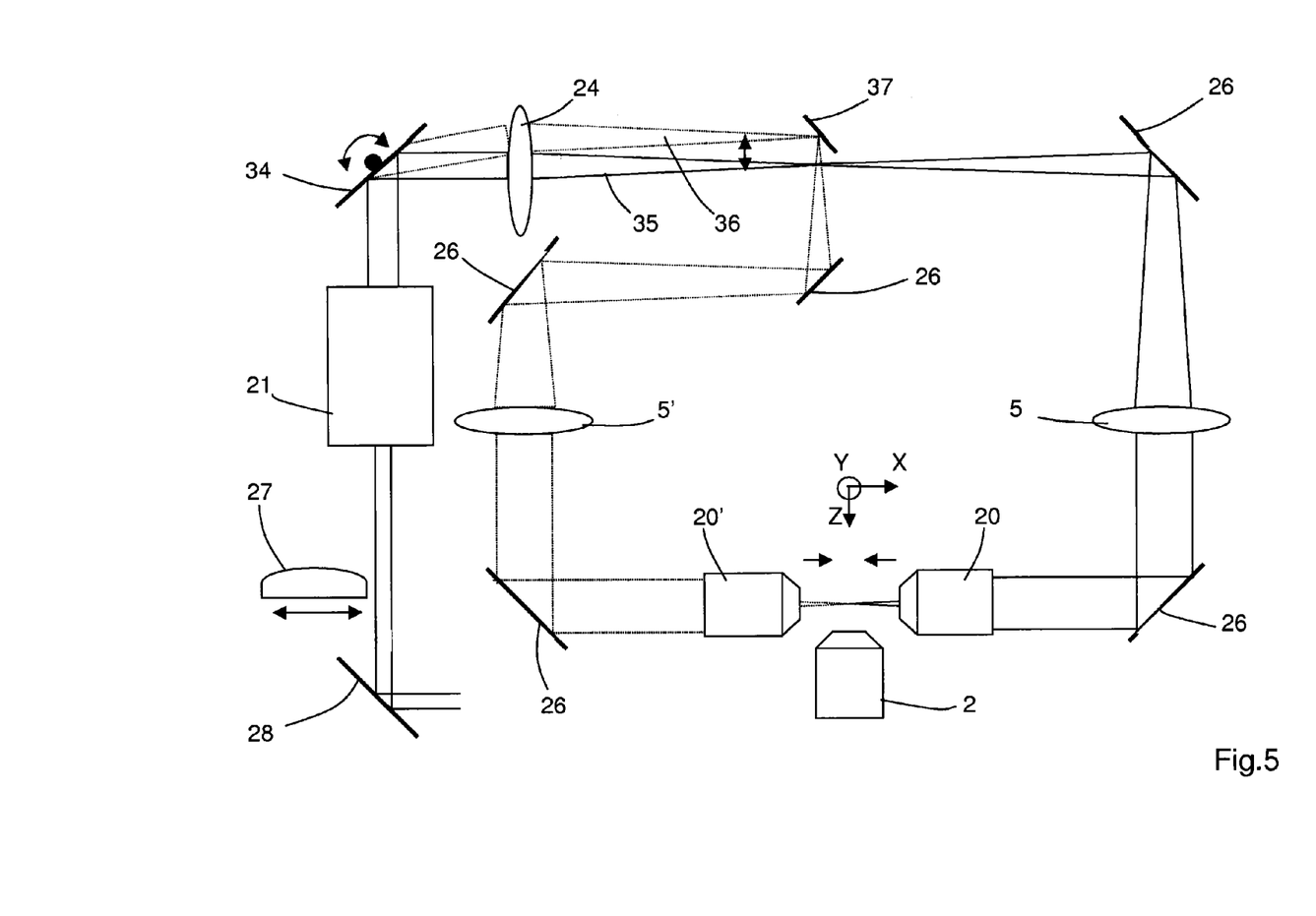
FIG. 5 shows an illumination beam path for illumination from two sides.

FIG. 5 shows a microscope, which may be provided with an illumination device 19, e.g. as illustrated in FIG. 2 and a detection device 1, e.g. as shown in FIG. 1, and in which the illumination device 19 additionally comprises means for deflecting illumination light into another illumination beam path 36 and for generating another light sheet with corresponding properties, i.e., one having an approximately planar extension in the direction of the illumination axis X and in the direction of the transverse axis Y. In the illumination beam path 35 and in the other illumination beam path 36, essentially identical optical elements are arranged, and both beam paths have the same optical path lengths; the one light sheet and the other light sheet are aligned with each other in such a way that they illuminate the sample region P from opposite directions on the same illumination axis X.

The illumination device 19 further comprises switching means for switching the illumination light between the illumination beam path 35 and the other illumination beam path 36. The switching means comprise a rapidly switchable switching element with a switching interval of less than 10 ms, with a specified integration time of the array detector 4 and the switching interval of the switching element being tuned to each other in such a way that the sample region P is illuminated at least once from each direction on the illumination axis X during the integration time.

Here, the switching element is designed as a rapidly switchable switching mirror 34. For example, the switching mirror 34 may be galvanometer-driven. The switching mirror 34 is arranged in a plane that is conjugate with the illumination pupil plane. In this way, rapidly switchable two-beam illumination can be achieved. Depending on the position of the switching mirror 34, the light is deflected either into the illumination beam path 35 or—with the aid of a deflecting mirror 37—into the other illumination beam path 36. Depending on the position of the switching mirror 34, thus, the light reaches either the illumination objective 20 or the illumination objective 20'. Both beam paths are designed to have the same optical elements and the same optical path lengths.

Instead of a switching mirror 34, other switching elements may be used as well, such as, e.g., acousto-optical or electro-optical switching elements, which may operate on a reflective or transmissive basis.

What is important is the short switching interval compared to the integration time of the array detector, which, as a rule, is not longer than 20 ms, as otherwise vibrations could have a negative effect; the switching interval must be so dimensioned that the sample region is illuminated at least once from each direction within the integration time. Multiple scans from each direction are also feasible if the switching interval is small enough, e.g., less than 5 ms.

Although this setup does not permit simultaneous illumination of the samples from both sides, the fact that the switching mirror 34 has very short switching intervals makes it possible to achieve quasi-simultaneous illumination if this should be required. For this purpose, it is only necessary to switch the illumination from one illumination beam path to the other once within the integration time of the camera, so that the sample appears in the image as being illuminated simultaneously from both sides, although in fact the illumination is sequential.

In effect, then, the sample in the sample region P is illuminated simultaneously from opposite directions along the illumination axis X, in that, during the integration time of the array detector 4, the illumination light is switched from one illumination beam path to the other at least once.

Figure 6:
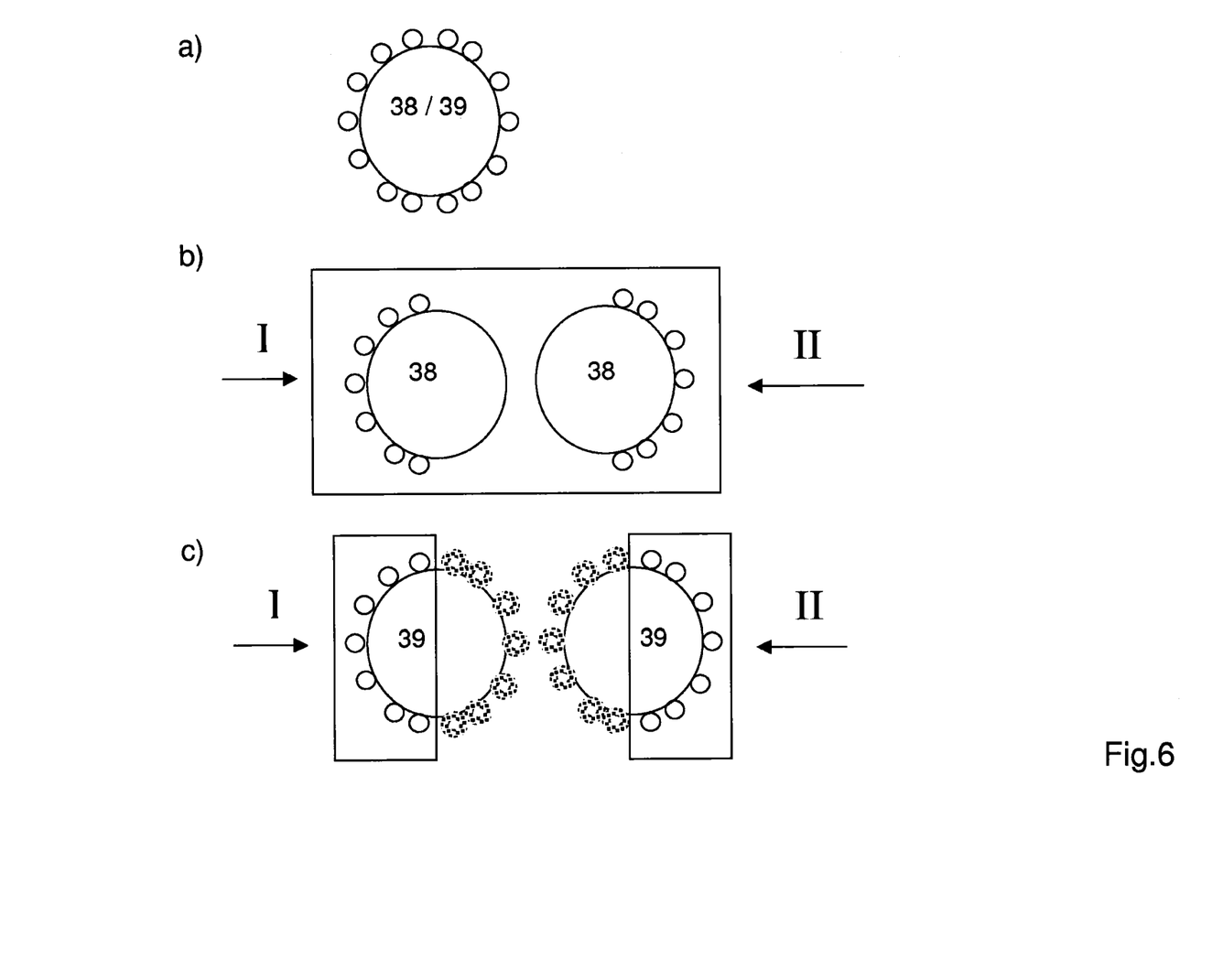
FIG. 6 shows the effects the illumination from two sides has on a sample.

FIG. 6 shows, as an example, a sample 38 in which sequential illumination is not absolutely necessary. FIG. 6a shows the ideal sample image without scatter artefacts. FIG. 6b shows the real images obtained with unilateral light sheet illumination from left (I) and right (II). Here, the sample 38 scatters so much that the two images produced with unilateral illumination do not show any structures in common; a meaningful generation of a common image is hardly possible, if at all, in this case. This is also the case if some light-blocking environment that is essentially nontransparent exists in the middle of the sample. This is the case, at least in part, e.g., with zebra fish embryos, where the embryo's yolk sac blocks the light. Because of the possible speed gain resulting from faster image recording and the omission of subsequent image processing, simultaneous illumination from both sides can make sense here. Although no genuinely simultaneous illumination is possible by means of the fast switching mirror 34 described above, what is possible is a quasi-simultaneous recording, which in effect corresponds to simultaneous illumination. During the integration time of the camera, fast switching-over is performed, which to the user is virtually imperceptible in the final image.

On the other hand, however, the fact that no genuinely simultaneous illumination of the sample is possible will avoid disadvantages occurring in some other samples. Such a sample is shown in FIG. 6 as sample 39; it may be a cell cluster, for example. FIG. 6a shows the ideal sample image with sharp structures throughout the sample region. FIG. 6c shows the real images obtained with unilateral light sheet illumination from left (I) and right (II). Scatter is so pronounced here that with unilateral illumination, while all parts of the sample remain visible, a quality loss from left to right or from right to left is evident. Here, simultaneous two-beam illumination is not appropriate, as the quality loss should be avoided if possible. Sequential illumination makes more sense here. However, sequential illumination must be accomplished very quickly, so that, when a stack of images in the detection direction Z is recorded, there is the possibility to illuminate each individual plane from both sides. Whereas motor-driven switching mirrors have too long switching intervals, with vibrations being possibly transmitted to the mirror, which impairs quality, the fast switching intervals needed, i.e., less than 10 ms, can readily be achieved by means of fast galvanometer-driven mirrors.

The setup shown in FIG. 5 further has the advantage that the switching mirror 34 is arranged in a pupil plane and, therefore, the position offset produced by the deflection of the switching mirror 34 and the scanning objective 24 is utilized for switching. Of course, other setups are feasible in which the angular offset is directly utilized for switching. Another advantage of the setup shown is the possibility to use the switching mirror 34, by means of a slight offset, simultaneously for light sheet adjustment in the detection direction Z.

The illumination device shown in FIG. 5 may also comprise, although not shown, light sheet generation means for generating a rotationally symmetric light beam—e.g., by means of a scanning mirror 23 and the scanning objective 24—to be used for light-sheet-like scanning of the sample region along the transverse axis, as well as optional angle scanning means—e.g., in the form of an angle scanning mirror 28—, by means of which an angle between the light sheet and the illumination axis can be varied.

Herein it may be of advantage that the illumination device comprises an astigmatically acting optical element, preferably a cylindrical optical element, arranged in the one illumination beam path or in the other illumination beam path and intended for the correct imaging of the switching mirror or of the scanning mirror onto a pupil plane. Whereas the one of the two mirrors is correctly imaged onto the pupil plane, the imaging of the other mirror would not be correct without such an additional astigmatically acting element; this, then, is an optical correction system for the correct imaging of both mirrors.

An interesting application will be possible if the array detector has areas of pixels that can be read out separately and for which different integration times can be specified, as it is the case, e.g., with modern array detectors on CMOS basis. Here, the switching interval of the switching element can additionally be synchronized also with these different integration times. This can also be combined with the embodiment shown in FIG. 4.

Figure 7:
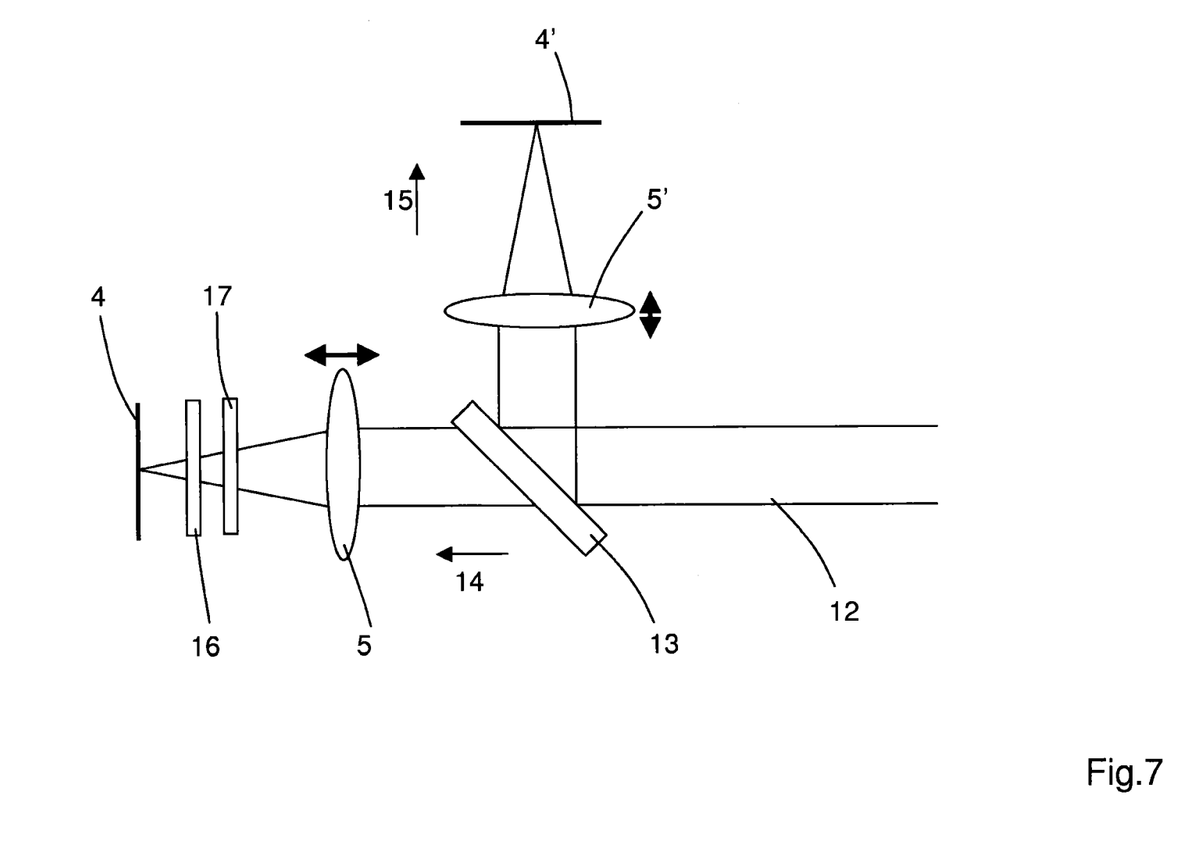
FIG. 7 shows a detail of a detection beam path with two channels.
Figure 8:
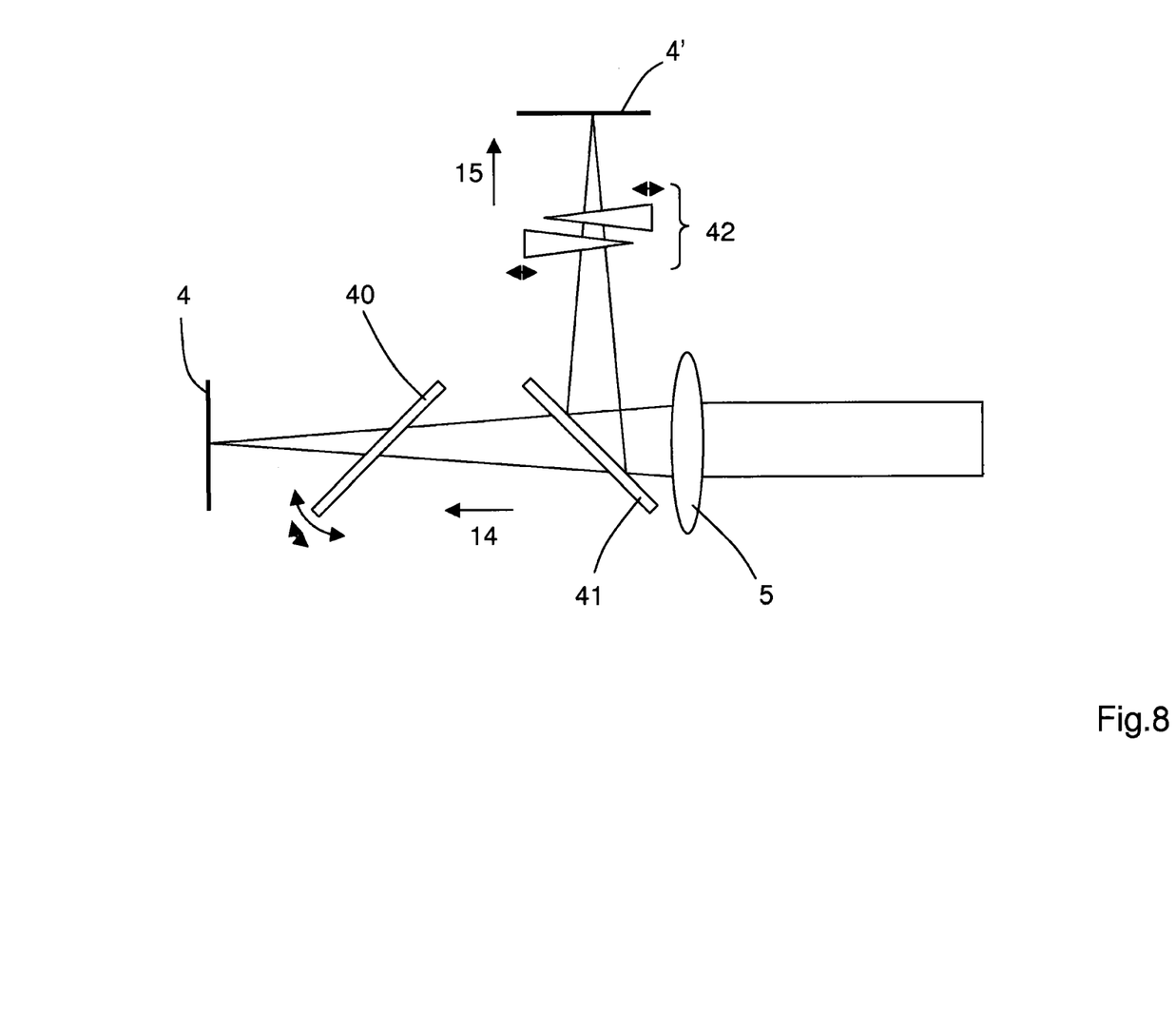
FIG. 8 shows a detail of another detection beam path with two channels.

FIG. 7 and FIG. 8 show splitting means for splitting the detection beam path into two branch beam paths 14 and 15, with a spatially resolving array detector 4 or 4', respectively, onto which the light to be detected is imaged, being arranged in each of the branch beam paths 14 and 15, and with the splitting means comprising at least one dichroic beam splitter 13 or 40, respectively. Both setups can be incorporated into a detection device 1 which is shown, e.g., in FIG. 1 and which can be combined with an illumination device 19 as shown in FIG. 2.

Thanks to the splitting of the detection beam path into two branch beam paths 14 and 15, and with simultaneous suppression of the excitation light with emission filters and bandpass filters, different spectral ranges can be detected via the branch beam paths 14, 15. This makes it possible to record several color ranges, if, e.g., the sample is labeled with fluorophores of different colors. If more than two colors are used, sequential recordings can be made in the so-called multitrack mode by changing the excitation lines and, perhaps, the dichroic beam splitters, bandpass filters or emission filters.

The spatially resolving array detectors 4 and 4' may be CCDs, EMCCDs, CMOS chips or the like, which may be integrated in the cameras employed by users. For mounting such cameras, it is expedient to provide a standard C-mount interface (not shown) that allows the fitting of different camera types and models. The C-mount tolerances of laterally 0.2 mm and the orientation, i.e., the image rotation of the camera, can be compensated, e.g., by adjusting screws.

In the embodiment shown in FIG. 7, the dichroic beam splitter 13 is arranged in the beam path in the near-infinity space 12 with reference to the spatially resolving array detectors 4 and 4'. The dichroic beam splitter 13 has a thickness of at least 3, preferably of at least 4 mm. In this way, image artefacts, particularly defocusing and astigmatism, which are known in prior art and are caused by surface tensions on the beam splitter, can be eliminated. Optical imaging elements 5 and 5', respectively, for imaging the light to be detected onto the respective array detector 4, 4', are arranged in each of the two branch beam paths 14 and 15.

As an option, the optical imaging elements 5 and 5' can, as shown here, be arranged so as to be shiftable in the respective branch beam paths 14 and 15, so that focusing on the respective array detector is possible. This can be of advantage, e.g., if a longitudinal chromatic aberration of the detection optical system has to be corrected. Since what is detected are individual spectral ranges or wavelengths only, very precise adaptation to the wavelength to be detected is possible. If, in addition, other means for focus shifting are provided, such as, e.g., a detection zoom element 6, it is sufficient to arrange a shiftable imaging element in one of the two branch beam paths, while the element in the other branch beam path may be fixed.

In at least one of the two branch beam paths 14 and 15, at least one wobble plate for generating a beam offset along two orthogonal directions transversely to the detection axis Z is arranged in addition. If only one wobble plate is used, it needs to be adjusted in both orthogonal directions. With equivalent effect, two wobble plates can be used. One of them is then used to adjust the beam offset in one direction, and the other is used to adjust it in the direction normal to it. FIG. 7 shows, for one of the two beam paths, i.e. the transmission beam path 14, two wobble plates 16 and 17 for generating a beam offset along two mutually orthogonal directions transversely to the detection axis Z.

One can use the wobble plate 16, e.g., for generating a beam offset in X-direction, and wobble plate 17 for generating a beam offset in Y-direction. In the other branch beam path 15, the reflection beam path, no wobble plates are required. In this way, an image overlay of the two detection channels can be achieved, which can also be accomplished automatically, provided that a calibration has been performed before by means of a calibration objective arranged and selectable in an intermediate image plane of the detection beam path, or by means of a suitable transmission pattern, e.g., a transmission grid pattern 7. Once the beam offset has been determined, the images of both array detectors 4, 4' can readily be superposed, and the user is shown only the superposition.

Focus adjustment can be achieved not only by means of a shifting of the optical imaging elements 5, 5', but also by arranging a wedge assembly 42 consisting of two optical wedges that protrude into the beam path and can be shifted transversely to the beam direction. The wedges are simple glass wedges that can be moved towards each other or away from each other. In this way, a variable, additional glass path is moved into the beam path or out of it, which causes a corresponding shifting of the focal plane of the optical imaging element 5 or 5', respectively. The wedge assembly 42 is arranged between the respective optical imaging element 5 or 5' and the respective array detector 4 or 4' in the divergent part of the beam path, but it is not shown in FIG. 7.

Another embodiment for two-channel detection is shown in FIG. 8. Here, a dichroic beam splitter 40 of any thickness is arranged in the divergent part of the imaging beam path, i.e. between the optical imaging element 5 and the array detectors 4 and 4'. In one of the two branch beam paths, viz. in the branch beam path 14 for the light transmitted by the beam splitter, a glass plate 41 is arranged between the array detector 4 and the beam splitter 40, with an angle of approximately 90° between the glass plate and the beam splitter 40. This glass plate 41 has the same thickness as the beam splitter 40; in this way, the astigmatism caused by the beam splitter 40 in the transmission direction is corrected.

In a preferred embodiment, the glass plate 41 can be used simultaneously as a wobble plate for adjusting the offset between the two camera channels. The glass plate 41 is needed only in the transmission beam path, i.e., in the branch beam path 14, which images the light transmitted by the beam splitter 40 onto the array detector 4. In the reflected branch beam path 15 in FIG. 8, the above-mentioned wedge assembly 42 is arranged, with which the focal plane of the optical imaging element 5 can be shifted by shifting the two glass wedges towards or away from each other (as indicated by the double-headed arrow). Such a wedge assembly 42 may also be arranged in the transmission beam path; in this case one can, e.g., drop the shifting of the optical imaging element 5 so that this need not be shiftable. In principle, though, it is sufficient to have the optical imaging element 5 shiftable and to introduce a wedge assembly 42 into one of the two beam paths. Whereas then, e.g., as in the example shown in FIG. 8, the focal plane for the transmission branch beam path is varied only by means of the optical imaging element 5, the focal plane for the reflection beam path can be further adjusted by means of the wedge assembly 42.

It is understood that the features mentioned before are applicable not only in the combinations stated but also in other combinations or as stand-alone features without leaving the scope of the present invention. The individual elements described above can all be combined with each other. It is also possible to use individual elements without other elements shown; for example, one can do without a zoom device when two branch detection beam paths are used simultaneously. The combination of illumination from two directions can be combined with detection in two channels, and this with the illumination and detection zoom elements and simultaneous internal focusing. Altogether, the arrangements described above exhibit substantial improvements over the arrangements known in prior art.

LIST OF REFERENCE NUMBERS 1 detection device
2 detection objective
3 tube lens unit
4, 4' array detector
5, 5' imaging element
6 detection zoom element
7 transmission grid pattern
8 tube lens
9, 10 deflecting mirror
11 beam coupler
12 near-infinity space
13 beam splitter
14, 15 branch beam path
16, 17 wobble plate
18 emission filter
19 illumination device
20 illumination objective
21 illumination zoom element
22 telescope changer
23 scanning mirror
24 scanning objective
25 tube lens element
26 mirror
27 cylindrical optical element
28 angle scanning mirror
29, 30 beam path
31, 32 beam segments
33 cylindrical optical element
34 switching mirror
35 illumination beam path
36 other illumination beam path
37 deflecting mirror
38, 39 sample
40 beam splitter
41 wedge assembly
42 glass plate

What is claimed is:

1. A microscope, comprising:
an illumination device, that generates a sheet of light extending along an illumination beam path for illuminating a sample region, the sheet of light having an illumination axis (X) in the direction of the illumination beam path and a transverse axis (Y) lying across the illumination axis (X), the sheet of light having an approximately planar extension,
a detection device used to detect light that is radiated by the sample region along a detection beam path in a direction of a detection axis (Z), wherein the angle between the illumination axis (X) and the detection axis (Z) are unequal to zero and the angle between the transverse axis (Y) and the detection axis (Z) are unequal to zero,
the illumination device comprising first means for scanned light sheet generation comprising means for generating a rotationally symmetric light beam and scanning means for planar scanning of the sample region along the transverse axis (Y) approximately in a plane of the sample region in a specified time interval,
wherein the illumination device comprises second means for light sheet generation, these comprising a first astigmatically acting optical element with at least one astigmatic lens for generating a static light sheet, and selecting means for generation of the light sheet, wherein either the first means for scanned light sheet generation or the second means for light sheet generation or both together can each be selected via the selecting means.

2. A microscope as claimed in claim 1, wherein the astigmatic lens is one of a cylindrical lens and a Powell lens.

3. A microscope as claimed in claim 1, wherein the illumination device comprises angle scanning means, which, if second means for light sheet generation have been selected, are arranged in a plane conjugate with an illumination focal plane and by means of which an angle between the light sheet and the illumination axis (X) can be varied.

4. A microscope as claimed in claim 3, wherein the scanning means comprise a rapidly switchable scanning mirror and a scanning objective, and in that the angle scanning means comprise a rapidly switchable angle scanning mirror.

5. A microscope as claimed in claim 4, wherein a second astigmatically acting optical element for the correct imaging of the scanning mirror onto a pupil plane is arranged in the illumination beam path.

6. A microscope, comprising:
an illumination device for illuminating a sample region on an illumination axis (X) of an illumination beam path and having a transverse axis (Y) lying across the illumination axis (X),
a detection device used to detect light that is radiated by the sample region along a detection beam path in a direction of a detection axis (Z), wherein the angle between the illumination axis (X) and the detection axis (Z) are unequal to zero and the angle between the transverse axis (Y) and the detection axis (Z) are unequal to zero,
wherein the illumination device provides a rotationally symmetric light beam providing a first scanned sheet of light that scans the sample region along the transverse axis (Y) in a specified time interval, providing a first scanned sheet of light having an approximately planar extension,
wherein the illumination device providing a second static sheet of light, with an astigmatically acting optical element, and
wherein the output from the illumination device is automatically selectable between the first scanned sheet of light on a first illumination beam path, the second static sheet of light on a second illumination beam path or both the first scanned sheet of light on a first illumination beam path, and the second static sheet of light on a second illumination beam path.

7. A microscope according to claim 6, wherein the astigmatically-acting optical element comprises one of a cylindrical lens and a Powell lens.

8. A microscope according to claim 6, wherein the detection device further comprises a transmission grid element moveable from a first position to a second position and adapted to collect an intermediate image transmission pattern sample, wherein the intermediate image transmission pattern sample is collected when the transmission grid is disposed in the first position in an intermediate image plane of the detection beam path.

9. A microscope according to claim 6, further comprising at least one mirror configured to reduce the linear length of at least one of: the illumination beam path, the first illumination beam path, and the second illumination beam path.

10. A microscope according to claim 9, wherein the at least one mirror couples to a high-speed motor adapted to move said at least one mirror from a first position to a second position.

11. A microscope according to claim 10, wherein the high-speed motor comprises one of a galvometer-drive, an acoustic-optic drive, and a electro-optic drive motor.

12. A microscope according to claim 11, wherein the mirror comprises one of a transmissive and a reflective mirror surface.

13. A microscope according to claim 6, wherein the first sheet of light that scans the sample region is configured to scan the sample region at more than two different scan angles.

14. A method of scanning a sample region, comprising:
scanning a sample region with an illumination device disposed on an illumination axis of an illumination beam path and having a transverse axis (Y) lying across the illumination axis,
detecting, using a detection device, light that is radiated by the sample region along a detection beam path in a direction of a detection axis, wherein the angle between the illumination axis and the detection axis are unequal to zero and the angle between the transverse axis and the detection axis are unequal to zero,
wherein the illumination device provides a rotationally symmetric light beam providing a first scanned sheet of light that scans the sample region along the transverse axis in a specified time interval, providing a first sheet of light having an approximately planar extension, approximately in a plane of the sample region,
wherein the illumination device providing a second static sheet of light, with an astigmatically acting optical element, and
wherein the output from the illumination device is automatically selectable between at least one of: the first scanned sheet of light on a first illumination beam path the second static sheet of light on a second illumination beam path or both the first scanned sheet of light on a first illumination beam path, and the second static sheet of light on a second illumination beam path.

15. A method according to claim 14, wherein the astigmatically-acting optical element comprises one of a cylindrical lens and a Powell lens.

16. A method according to claim 14, wherein the illumination device comprises angle scanning means, which, if second means for light sheet generation have been selected, are arranged in a plane conjugate with an illumination focal plane and by means of which an angle between the light sheet and the illumination axis can be varied.

17. A method according to claim 14, wherein the scanning step includes a rapidly switchable scanning mirror and a scanning objective, and wherein that the scanning occurs via a rapidly switchable angle scanning mirror.

18. A method according to claim 17, further comprising an actuator coupled to the motorized mirror and said actuator comprises one of a galvanically-driven actuator, an acoustic-optically-driven actuator, and electro-optically-driven actuator.

19. A method according to claim 18, wherein the actuator couples to a controller for an imaging device coupled to the sample region and the controller synchronizes both the illumination of the sample region and an imaging procedure for the sample region.

20. A method according to claim 14, wherein the detection device further comprises a transmission grid element moveable from a first position to a second position and adapted to collect an intermediate image transmission pattern sample, wherein the intermediate image transmission pattern sample is collected when the transmission grid is disposed in the first position in an intermediate image plane of the detection beam path.

* * * * *